(12) United States Patent
Cristea

(10) Patent No.: US 12,406,578 B2
(45) Date of Patent: Sep. 2, 2025

(54) TECHNIQUES FOR PROVIDING SPEED LIMIT INFORMATION

(71) Applicant: HARMAN BECKER AUTOMOTIVE SYSTEMS GmbH, Karlsbad-Ittersbach (DE)

(72) Inventor: Liviu Lucian Cristea, Munich (DE)

(73) Assignee: Harman Becker Automotive Systems Gmbh, Karlsbad-Ittersbach (DE)

( * ) Notice: Subject to any disclaimer, the term of this patent is extended or adjusted under 35 U.S.C. 154(b) by 137 days.

(21) Appl. No.: 17/865,221

(22) Filed: Jul. 14, 2022

(65) Prior Publication Data

US 2023/0021313 A1    Jan. 26, 2023

Related U.S. Application Data

(60) Provisional application No. 63/224,180, filed on Jul. 21, 2021.

(51) Int. Cl.
*G08G 1/0967* (2006.01)
*G08G 1/0969* (2006.01)

(52) U.S. Cl.
CPC . *G08G 1/096775* (2013.01); *G08G 1/096725* (2013.01); *G08G 1/0969* (2013.01); *G08G 1/096741* (2013.01)

(58) Field of Classification Search
CPC ....... G08G 1/096775; G08G 1/096725; G08G 1/0969; G08G 1/096741
See application file for complete search history.

(56) References Cited

U.S. PATENT DOCUMENTS

| 11,131,550 B2 * | 9/2021 | Jin ..................... G01C 21/3655 |
| 2019/0186926 A1 * | 6/2019 | Koponen ............... G01C 21/30 |
| 2020/0208995 A1 * | 7/2020 | Hou ........................ G01C 21/34 |

FOREIGN PATENT DOCUMENTS

| CN | 112504291 B | * | 5/2023 | ......... G01C 21/3438 |
| JP | 2019523398 A | * | 7/2017 | |

OTHER PUBLICATIONS

EUR-Lex, Access to European Union Law, Document 02019R2144-20220706, Nov. 27, 2019, https://eur-lex.europa.eu/legal-content/EN/TXT/?uri=CELEX%3A02019R2144-20220706, 51 pages.

(Continued)

*Primary Examiner* — Curtis A Kuntz
*Assistant Examiner* — James E Munion
(74) *Attorney, Agent, or Firm* — Artegis Law Group, LLP

(57) ABSTRACT

Embodiments of the present disclosure set forth techniques for providing speed limit information to a vehicle. In an aspect, a computer-implemented method includes receiving, from a vehicle, navigation information associated with the vehicle; determining one or more predicted positions associated with the vehicle based on the navigation information; determining one or more candidate map regions associated with the vehicle based on the one or more predicted positions; associating corresponding speed limit information with each of the one or more candidate map regions; and transmitting, to the vehicle, the one or more candidate map regions; wherein the one or more candidate map regions are usable by the vehicle to provide speed limit information to a driver of the vehicle.

19 Claims, 5 Drawing Sheets

(56) References Cited

OTHER PUBLICATIONS

Mobility and Transport, European Road Safety Charter, "Intelligent speed assistance (ISA) set to become mandatory across Europe", Jul. 14, 2022, https://road-safety-charter.ec.europa.eu/resources-knowledge/media-and-press/intelligent-speed-assistance-isa-set-become-mandatory-across_en, 2 pages.

Graziella Jost, "Opinion: will Intelligent Speed Assistance (ISA) live up to its promise?", European Transport Safety Council, https://etsc.eu/opinion-will-intelligent-speed-assistance-isa-live-up-to-its-promise/, May 31, 2022, 3 pages.

\* cited by examiner

TECHNIQUES FOR PROVIDING SPEED LIMIT INFORMATION

CROSS-REFERENCE TO RELATED APPLICATIONS

This application claims the priority benefit of U.S. Provisional Application No. 63/224,180, filed on Jul. 21, 2021, titled "TECHNIQUES FOR PROVIDING SPEED LIMIT INFORMATION." The subject matter of this application is incorporated by reference herein in its entirety.

BACKGROUND

Field of the Various Embodiments

The various embodiments relate generally to vehicle information systems, and more specifically, to techniques for providing speed limit information.

DESCRIPTION OF THE RELATED ART

Intelligent speed assistance (ISA) is a driver assistance technology that can be implemented by vehicles to provide speed limit information (SLI) to an operator (e.g., driver) of a vehicle, and in some cases, to actively intervene to adjust a speed of the vehicle. Certain jurisdictions, most notably the European Union, have adopted regulations that mandate ISA in new vehicles.

A typical ISA implementation includes a camera on the vehicle for recognizing speed limit signs on roads and on-board correlation of a current location of the vehicle to a map database that includes speed limit information. Additionally, the map database needs periodic updating to maintain reliability of the ISA implementation. A drawback of this approach is that this approach is resource intensive. This approach entails inclusion of a navigational system and a map database in the vehicle. However, many existing or new entry level vehicles are unable to support a navigational system without significant additional expense. Further, this approach requires a high level of computational power for the location-to-map correlation process, which can significantly increase the cost of an entry level vehicle. Accordingly, this approach can make entry level vehicles more expensive.

As the foregoing illustrates, what is needed are more effective techniques for providing speed limit information in vehicles.

SUMMARY

One embodiment sets forth a computer-implemented method comprising receiving, from a vehicle, navigation information associated with the vehicle; determining one or more predicted positions associated with the vehicle based on the navigation information; determining one or more candidate map regions associated with the vehicle based on the one or more predicted positions; associating corresponding speed limit information with each of the one or more candidate map regions and transmitting, to the vehicle, the one or more candidate map regions; wherein the one or more candidate map regions are usable by the vehicle to provide speed limit information to a driver of the vehicle.

One embodiment sets forth a computer-implemented method comprising transmitting navigation information associated with a vehicle to a server; receiving, at the vehicle and from the server, map region information associated with a plurality of candidate map regions; selecting a first candidate map region included in the plurality of candidate map regions based on a location of the vehicle; and causing one or more operations to be performed at the vehicle based on speed limit information associated with the first candidate map region.

Further embodiments provide, among other things, one or more non-transitory computer-readable media and systems configured to implement the methods set forth above.

At least one technical advantage of the disclosed techniques relative to the prior art is that, with the disclosed techniques, a vehicle can obtain and output speed limit information using less computational resources, including less processing power and data storage in the vehicle, compared to prior approaches. Accordingly, intelligent speed assistance can be implemented in a vehicle at lower cost, including for example using a simpler, less expensive, lower power processor. Additionally, with the disclosed techniques, a vehicle does not need to have access to a navigational database and does not need to update the navigational database, which reduces the memory and/or storage required in the vehicle, the bandwidth needed to receive the updates, and/or service time at a vehicle dealer to install updates. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Figure 1:
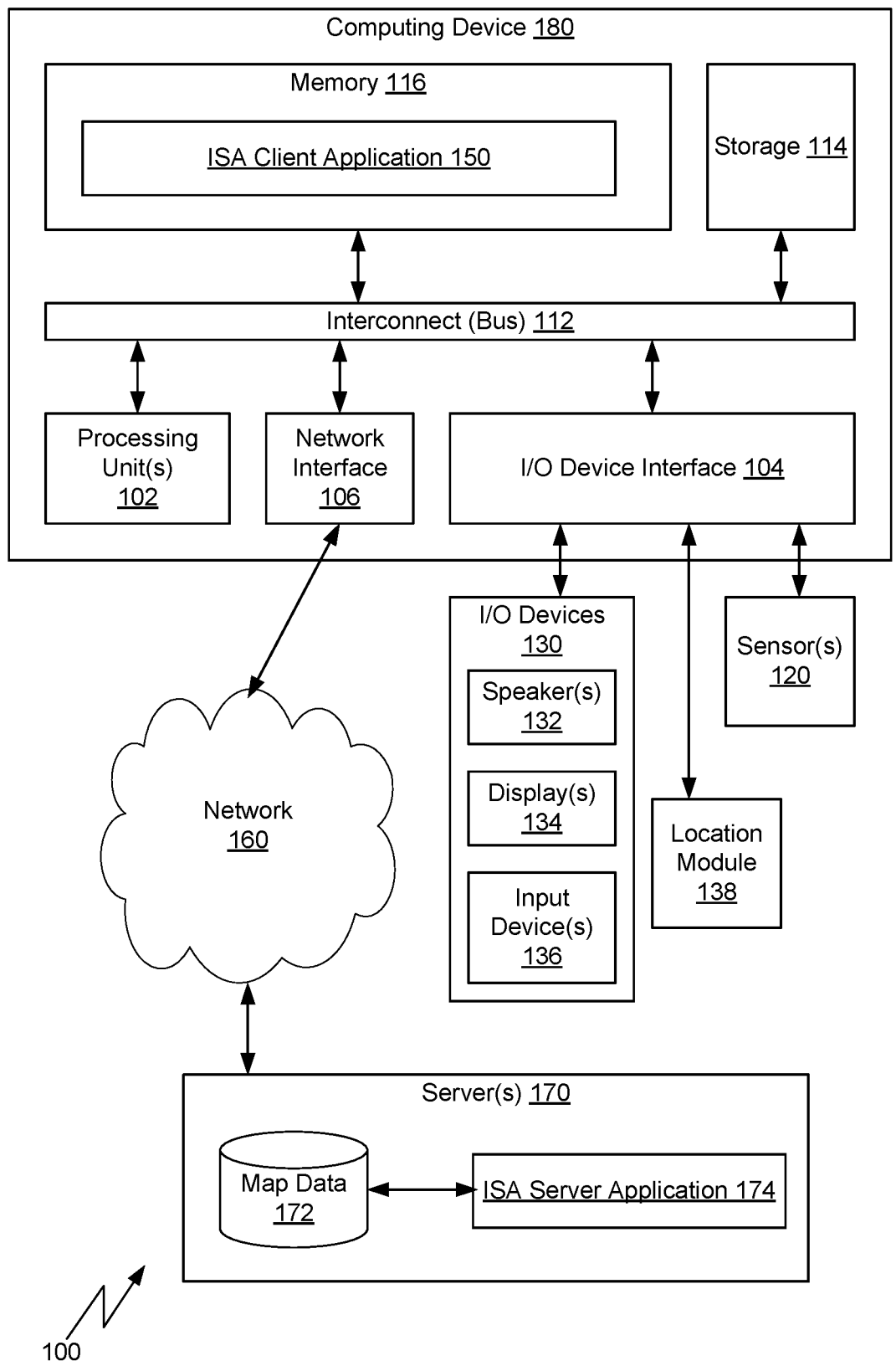
FIG. 1 is a block diagram of a vehicle-based computer system configured to implement one or more aspects of the various embodiments.

FIG. 1 illustrates a block diagram of a vehicle-based computer system 100 configured to implement one or more aspects of the various embodiments. As shown, vehicle-based computer system 100 includes, without limitation, computing device 180, sensor(s) 120, input/output (I/O) device(s) 130, location module 138, network 160, and server(s) 170. Computing device 180 is located in a vehicle and includes, without limitation, a processing unit 102, I/O device interface 104, network interface 106, interconnect (bus) 112, storage 114, and memory 116. Memory 116 stores an Intelligent Speed Assist (ISA) client application 150. Network 160 couples computing device 180 to server(s) 170. Each of server(s) 170 include map data 172 and an ISA server application 174. Processing unit 102, I/O device interface 104, network interface 106, storage 114, and memory 116 can be communicatively coupled to each other via interconnect 112.

Computing device 180 includes processing unit 102 and memory 116. Computing device 180 can be a device that includes one or more processing units 102, such as a system-on-a-chip (SoC). In some embodiments, computing device 180 is implemented within a vehicle. For example, computing device 180 could be included in a head unit and/or other in-vehicle computing system.

Processing unit 102 includes a central processing unit (CPU), a digital signal processing unit (DSP), a microprocessor, an application-specific integrated circuit (ASIC), a neural processing unit (NPU), a graphics processing unit (GPU), a field-programmable gate array (FPGA), and/or the like, or a combination of multiple processing units, such as a CPU configured to operate in conjunction with a GPU. Processing unit 102 generally comprises a programmable processor that executes program instructions to manipulate input data. In some embodiments, processing unit 102 includes any number of processing cores, memories, and other modules for facilitating program execution. For example, processing unit 102 could receive input from a user via I/O devices 130 and generate pixels for display on an I/O device 130 (e.g., a display device 134). In some embodiments, processing unit 102 can be configured to execute ISA client application 150 in order to provide speed limit information to the driver of the vehicle and/or perform one or more operations based on the speed limit information.

In various embodiments, storage 114 includes non-volatile storage for applications, software modules, and data, and can include fixed or removable disk drives, flash memory devices, and CD-ROM, DVD-ROM, Blu-Ray, HD-DVD, or other magnetic, optical, solid state storage devices, and/or the like. For example, ISA client application 150 could be stored in storage 114, and then loaded into memory 116 as needed.

In various embodiments, memory 116 includes a memory module or collection of memory modules. Memory 116 generally comprises storage chips such as random access memory (RAM) chips that store application programs and data for processing by processing unit 102. Processing unit 102, I/O device interface 104, and network interface 106 are configured to read data from and write data to memory 116. ISA client application 150 can be loaded from storage 114 into memory 116. While in memory 116, ISA client application 150 is executed by processing unit 102 to implement the functionality described in the present disclosure.

In various embodiments, processing unit 102 is configured to store values in storage 114 and/or memory 116, and/or retrieve values stored in storage 114 and/or memory 116. For example, processing unit 102, executing ISA client application 150, stores speed limit information and/or map region information in storage 114 between the receipt of updates from ISA server application 174.

Sensor(s) 120 include one or more devices that perform measurements and/or acquire data related to vehicle operation, such as vehicle speed information and/or the like. In some embodiments, sensor(s) 120 are coupled to computing device 180 via a CAN bus and/or other in-vehicle communication network. Examples of sensors 120 include, without limitation, accelerometers, gyroscopes, magnetometers, light sensors, thermometers, inertial measurement units, compass, vehicle tilt sensors, crankshaft sensors, rain sensors, engine temperature sensors, intake-air temperature sensors, coolant temperature sensors, outdoor temperature sensors, accelerator pedal sensors, wheel speed sensors, air conditioning on/off sensors, air-mass sensors, steering angle sensors, road speed sensors, parking sensors, lambda sensors, seat belt sensors, transmission range sensors, knock sensors, and/or the like.

Location module 138 includes hardware and/or software components for determining a geographic location of computing device 180 (e.g., a current location of the vehicle). In some examples, location module 138 determines a location of computing device 180 via acquisition of geolocation data (e.g., from a global navigation satellite system, such as a global positioning system (GPS), GNSS, Glonass, Galileo, Beidou, etc.) and/or determination of location based on sensor data from sensors 120 (e.g., dead reckoning).

I/O device(s) 130 includes devices capable of receiving input, such as a keyboard, a mouse, a touch-sensitive screen, a microphone and other input devices for providing input data to computing device 180. In various embodiments, I/O device(s) 130 includes devices capable of providing output, such as a display screen, one or more speakers (e.g., a loudspeaker array for spatial sound generation, ultrasound speakers for highly directional sound generation), haptic devices, touchless haptic devices (e.g., for creating haptic sensations at a distance), and/or the like. One or more of I/O devices 130 can be incorporated in computing device 180 or may be external to computing device 180. I/O devices 130 interface with computing device 180 via I/O devices interface 104. In some embodiments, computing device 180 and/or one or more I/O device(s) 130 may be components of an infotainment system implemented in a vehicle.

In various embodiments, I/O devices 130 include one or more audio speakers 132, one or more display devices 134, and/or one or more input devices 136. Examples of display devices 134 include, without limitation, LCD displays, LED displays, heads-up displays, head-mounted displays, and touch-sensitive screens. Examples of input devices 136 include, without limitation, buttons, knobs, dials, a touch-pad, a touch-sensitive screen, joysticks, and a microphone. Additionally, I/O devices 130 can include other devices capable of receiving input and/or output.

Network 160 enables communications between computing device 180 and other devices in network 160 via wired and/or wireless communications protocols, satellite networks, V2X networks, including Bluetooth, Bluetooth low energy (BLE), wireless local area network (WiFi), cellular protocols, and/or near-field communications (NFC). Network 160 is any technically feasible type of communications network that allows data to be exchanged between computing device 180 and other devices in network 160 (e.g., server(s) 170). For example, network 160 could include a wide area network (WAN), a local area network (LAN), a wireless network (e.g., a Wi-Fi network, a cellular data network), and/or the Internet, among others. Computing device 180 connects with network(s) 160 via network interface 106. In some embodiments, network interface 106 is hardware, software, or a combination of hardware and software, that is configured to connect to and interface with network(s) 160.

Server(s) 170 include any type of cloud computing system, cloud-based storage, distributed computing system, or other networked computing device or system. Although not shown, each of server(s) 170 may include processing unit(s), memory, storage, a network interface, and/or an I/O device interface similar to those described with respect to computing device 180. Server(s) 170 include map data 172 describing road segments and corresponding speed limit information. In some embodiments, map data 172 includes a database of road segments and corresponding information (e.g., road name, geolocation of the road segment, road signs along the road segment), including corresponding speed limit information, and/or the like. Map data 172 is periodically updated to capture changes in road configurations, speed limits, and/or the like. In various embodiments, map data 172 remains at server(s) 170, and computing device 180 does not need to access map data 172 (e.g., computing device 180 is not required to store map data 172). Accordingly, computing device 180 does not need to receive map data updates or be serviced to have map data updates installed. Server(s) 170 further includes an ISA server application 174 that receives navigation information from ISA client application 150, determines speed limit information from the navigation information and map data 172, and provides the speed limit information to ISA client application 150 as described in further detail below. In some embodiments, ISA server application 174 executes in one or more virtual machines.

Figure 2:
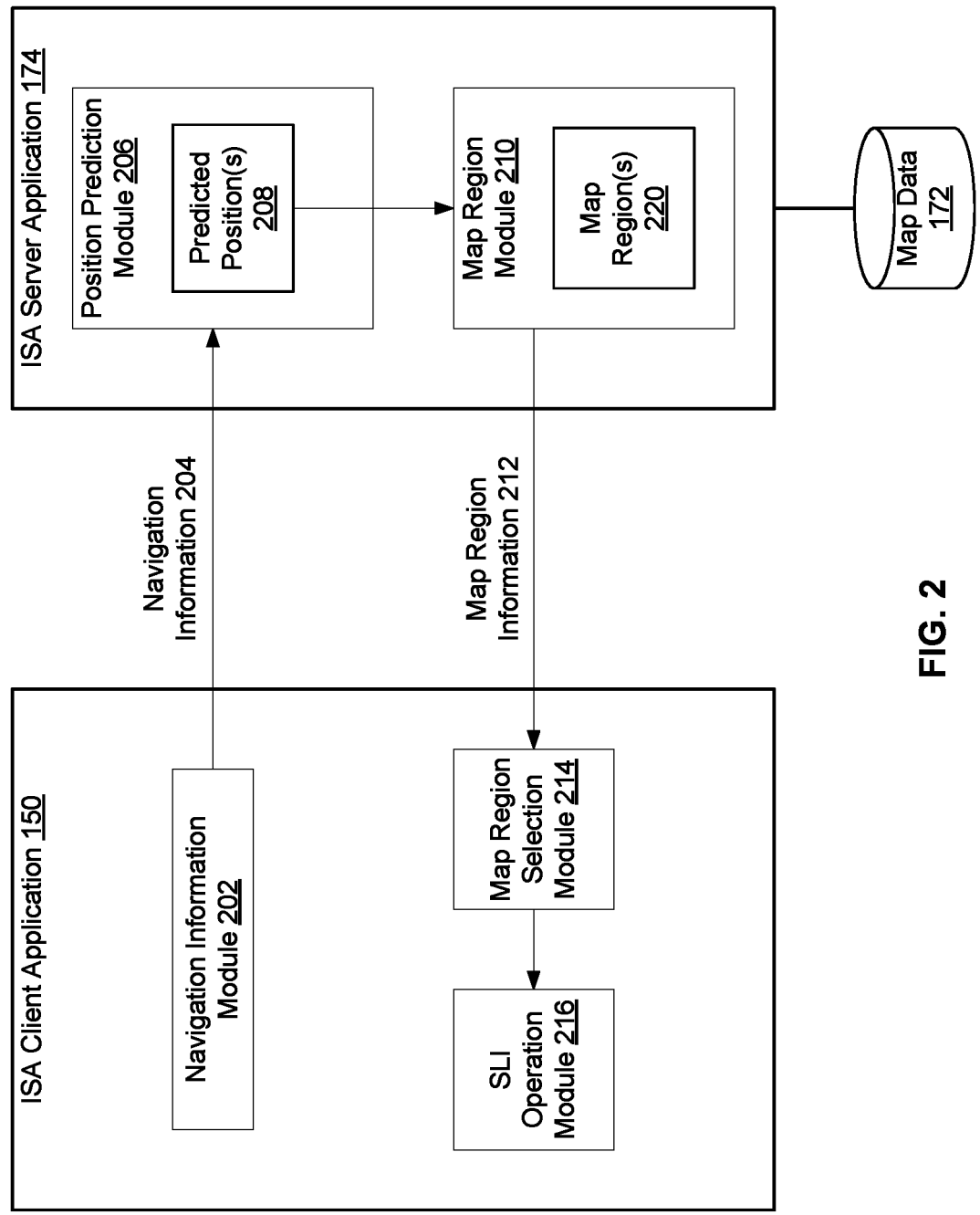
FIG. 2 illustrates aspects of the computer system of FIG. 1 in further detail, according to one or more aspects of the various embodiments.

FIG. 2 illustrates aspects of vehicle-based computer system 100 in further detail, according to one or more aspects of the various embodiments. Vehicle-based computer system 100, as described above, includes ISA client application 150 and ISA server application 174. As shown, ISA client application 150 includes, without limitation, navigation information module 202, map region selection module 214, and speed limit information operation module 216. As shown, ISA server application 174 includes, without limitation, position prediction module 206 and map region module 210.

In operation, navigation information module 202 determines navigation information 204 associated with a vehicle that includes computing device 180. In some embodiments, navigation information 204 includes a geolocation of the vehicle, a travelling direction of the vehicle, and a speed of the vehicle. Alternatively, the traveling direction and the speed of the vehicle can be combined as a velocity of the vehicle. The geolocation of the vehicle is a location of the vehicle, which can be expressed as coordinates (e.g., latitude and longitude). Navigation information module 202 obtains the geolocation via location module 138. The travelling direction is a direction toward which the vehicle is travelling or facing, which can be expressed as a cardinal direction or an angular degree relative to north. Navigation information module 202 obtains the direction via location module 138 and/or sensors 120 (e.g., a compass). A speed of the vehicle is the speed at which the vehicle is travelling. Navigation information module 202 can obtain the vehicle speed via a speedometer on the vehicle. ISA client application 150 transmits navigation information 204 to ISA server application 174 on server(s) 170 via a network, such as network 160. In some embodiments, navigation information module 202 determines and transmits navigation information 204 periodically based on time (e.g., every minute) or distance travelled (e.g., every 100 meters travelled), at a next update time determined by ISA server application 174, and/or the like.

Position prediction module 206 receives navigation information 204 from computer device 180 and processes navigation information 204 to determine a predicted position 208 of the vehicle. Predicted position 208 represents a geolocation position (e.g., coordinates) at which the vehicle is predicted to be located in the near future based on the geolocation, the travelling direction, and the speed of the vehicle. In some embodiments, position prediction module 206 first matches the geolocation of the vehicle to a map area (e.g., a road segment); the matched map area represents where on the map the vehicle is currently travelling. Position prediction module 206 then determines, based on the travelling direction and speed on the matched map area, including the road segments included in the matched map area, one or more predicted positions 208 based on whether the vehicle continues traveling on the current road segment or takes one or more turns onto intersecting road segments. In some embodiments, position prediction module 206 determines a plurality of predicted positions 208. Each of the plurality of predicted positions 208 corresponds a candidate prediction of a location on the map to which the vehicle will travel based on the geolocation, travelling direction, vehicle speed, and the matched map area.

Position prediction module 206 can determine predicted position(s) 208 using any suitable and technically feasible approach. For example, position prediction module 206 can implement a machine learning-based technique that determines predicted position(s) 208 using a trained model of driving behaviors. In some embodiments, position prediction module 206 determines a predicted position(s) 208 along with an associated confidence level. For example, position prediction module 206 could determine a plurality of predicted positions 208 and a confidence level for each determined predicted position.

In some embodiments, position prediction module 206 determines predicted position(s) 208 for a certain amount of time or distance of travel from of the vehicle geolocation, given the travelling direction and speed. For example, position prediction module 206 could determine predicted position(s) 208 that is 5 seconds ahead of travel from the vehicle geolocation. As another example, position prediction module 206 could determine a predicted position(s) 208 that is 100 meters ahead of travel from the vehicle geolocation. In some embodiments, the predict-ahead time or distance for predicted position(s) 208 is between 1-5 seconds or 1-100 meters, respectively. In some embodiments, the predict-ahead time or distance is configurable (e.g., by the driver of the vehicle). Further, in some embodiments, position prediction module 206 dynamically selects a predict-ahead time or distance based on navigation information 204 and information derived from navigation information 204. For example, position prediction module 206 could determine, based on the geolocation, that the type of road currently travelled is a long-stretch road (e.g., a highway) with few or no intersecting roads, and thus could then select a longer predict-ahead time or distance based on a lower possibility that the vehicle will deviate from the road currently being travelled on. As another example, position prediction module 206 could determine, based on the geolocation, that the type of road currently travelled is a city street with intersecting roads in proximity, and thus could then select a shorter predict-ahead time or distance based on a higher possibility that the vehicle will deviate from the road currently travelled.

In some embodiments, position prediction module 206 also determines a next update time based on navigation information 204 and map data 172. The next update time is a next earliest time that ISA client application 150 is suggested to wait to transmit updated navigation information 204 to ISA server application 174 in order to have ISA server application 174 determine new predicted position(s) 208. The next update time can be expressed as a timestamp of when ISA client application 150 could next send navigation information 204, or an amount of time for ISA client application 150 to wait after the last transmission of navigation information 204 to send updated navigation information 204.

Map region module 210 receives predicted position(s) 208 from position prediction module 206. Map region module 210 determines one or more map regions 220 based on predicted position(s) 208 and map data 172. In some embodiments, map region module 210 determines a map region 220 for each of a plurality of predicted positions 208. A map region 220 represents a map area (e.g., one or more road segments) that has a common, specified speed limit for that area. In some embodiments, a map region 220 is a map area that is specified as a simple polygonal (convex or concave) area defined by at least three vertices, where the vertices are geolocations (e.g., location coordinates). Map region(s) 220 correspond to map areas that are candidates for being a part of the vehicle's actual path based on predicted position(s) 208.

In some embodiments, map region module 210 identifies, in map data 172, one or more road segments that are in proximity to predicted position(s) 208. Map region module 210 also retrieves speed limit information (e.g., speed limit values) of those road segments from map data 172. Map region module 210 generates one or more map regions 220 covering those road segments. A map region 220 covers one or more road segments with a common speed limit, and can cover travel in one or both directions of a road segment. Map region module 210 generates a map region 220 for a road segment on which a predicted position 208 is located. In some embodiments, map region module 210 generates a map region 220 for each of one or more road segments. In some embodiments, map region module 210 can generate a map region 220 that covers multiple road segments (e.g., multiple intersecting or connected road segments) that have a common speed limit. Map regions for each of the one or more predicted positions are described in further detail below in FIG. 3.

Map region module 210 also determines one or more map regions, amongst map regions 220, for special cases. In some embodiments, map region module 210 determines that a predicted position 208 is within or in proximity of a tunnel (e.g., the tunnel is located from a predicted position 208 at a distance that may be reachable before the next time ISA client application 150 transmits navigation information 204). Based on the predicted position 208 being determined to be within or in proximity of a tunnel, map region module 210 determines a map region, amongst map regions 220, that covers the tunnel. A map region 220 corresponding to a tunnel (hereinafter a "tunnel map region") includes an indication that the tunnel map region corresponds to a tunnel, but is otherwise similar to other map regions 220 described above (e.g., includes a polygonal area defined by geolocation vertices, etc.). A tunnel map region provides speed limit information for a road segment in a tunnel, where the vehicle is unable to obtain a geolocation via location module 138 and is unable to communicate with server(s) 170.

In some embodiments, map region module 210 determines a default or fallback map region amongst map regions 220. The default map region covers a map area surrounding predicted position 208 and corresponds to a large area that encompasses a type of road (e.g., rural, urban, highway) with a common speed limit. The default map region has a speed limit that is associated with the country, region, and/or type of road where the vehicle is travelling, and thus can cover a larger map area than other map regions 220 determined by map region module 210. A default map region provides default speed limit information when the geolocation of the vehicle does not fall within the areas of other map regions 220. More generally, a default map region is similar to other map regions 220 (e.g., being a polygonal region with location coordinates as vertices, has a speed limit for the region), with possible differences as described above.

ISA server application 174 transmits map region information 212 to ISA client application 150 on computing device 180 via a network, such as network 160. Map region information 212 includes data indicating map region(s) 220 generated by map region module 210. For a given map region 220, map region information 212 includes location coordinates corresponding to polygonal vertices of the given map region 220, and a speed limit value (e.g., 50 miles per hour, 40 km per hour, etc.) for the given map region 220. In some embodiments, ISA server application 174 also transmits a next update time, determined by position prediction module 206, to ISA client application 150. In some embodiments, map region information 212 also includes data indicating a default map region and/or a tunnel map region amongst map regions 220. Data indicating a tunnel map region includes an indication that the tunnel map region corresponds to a tunnel. ISA client application 150 receives map region information 212 from ISA server application 174. In some embodiments, ISA client application 150 caches map region information 212 (e.g., in memory 116). In some embodiments, map regions 220 do not overlap with each other, other than a default map region possibly overlapping with one or more other map regions 220.

Map region selection module 214 selects a map region amongst map regions 220 included in map region information 212 based on the geolocation of the vehicle. That is, map region selection module 214 determines a geolocation of the vehicle via location module 138 and compares that vehicle geolocation to the map regions 220 included in map region information 212 to determine whether the vehicle geolocation is within one of the map regions. Map region selection module 214 performs the comparison of the vehicle geolocation to a given map region 220 by comparing the vehicle geolocation to the polygonal region of the map region. If the vehicle geolocation is not within the polygonal region of a map region, then that map region is not selected. If the vehicle geolocation is within the polygonal region of a map region, then map region selection module 214 selects that map region. If map region selection module 214 is unable to determine a geolocation of the vehicle, then map region selection module 214 selects a tunnel map region if one is included in map region information 212 (under the assumption that the location module 138 is unable to determine the geolocation because the vehicle is in a tunnel). If map region selection module 214 is unable to determine a geolocation of the vehicle and no tunnel map region is included in map region information 212, or if the vehicle geolocation is not in the polygonal region of any of map regions 220 included in map regions 220 other than the default map region, then map region selection module 214 selects the default map region.

After selecting a map region amongst map regions 220, map region selection module 214 passes the speed limit value for the selected map region to SLI operation module 216. SLI operation module 216 performs one or more operations and/or causes one or more operations to be performed based on the speed limit value. In some examples, SLI operation module 216 outputs the value to an in-vehicle user interface (e.g., graphical user interface, heads-up display, text-to-speech system) for output to the user (e.g., displayed on display device 134, read out in speech on speakers 132). In some examples, SLI operation module 216 additionally intervenes in operation of the vehicle based on the speed limit value. For example, if the current speed of the vehicle is determined to exceed the speed limit value (e.g., exceed the speed limit value by any amount or by at least a minimum amount), SLI operation module 216 can instruct a braking system in the vehicle to apply brakes in order to decrease the vehicle speed.

After ISA client application 150 receives map region information 212, ISA client application 150 waits for the next update time to determine and transmit new navigation information 204 to ISA server application 174. In some examples, the next update time is determined by ISA server application 174 and transmitted along with map region information 212, is a configured update period, and/or the like.

Figure 3:
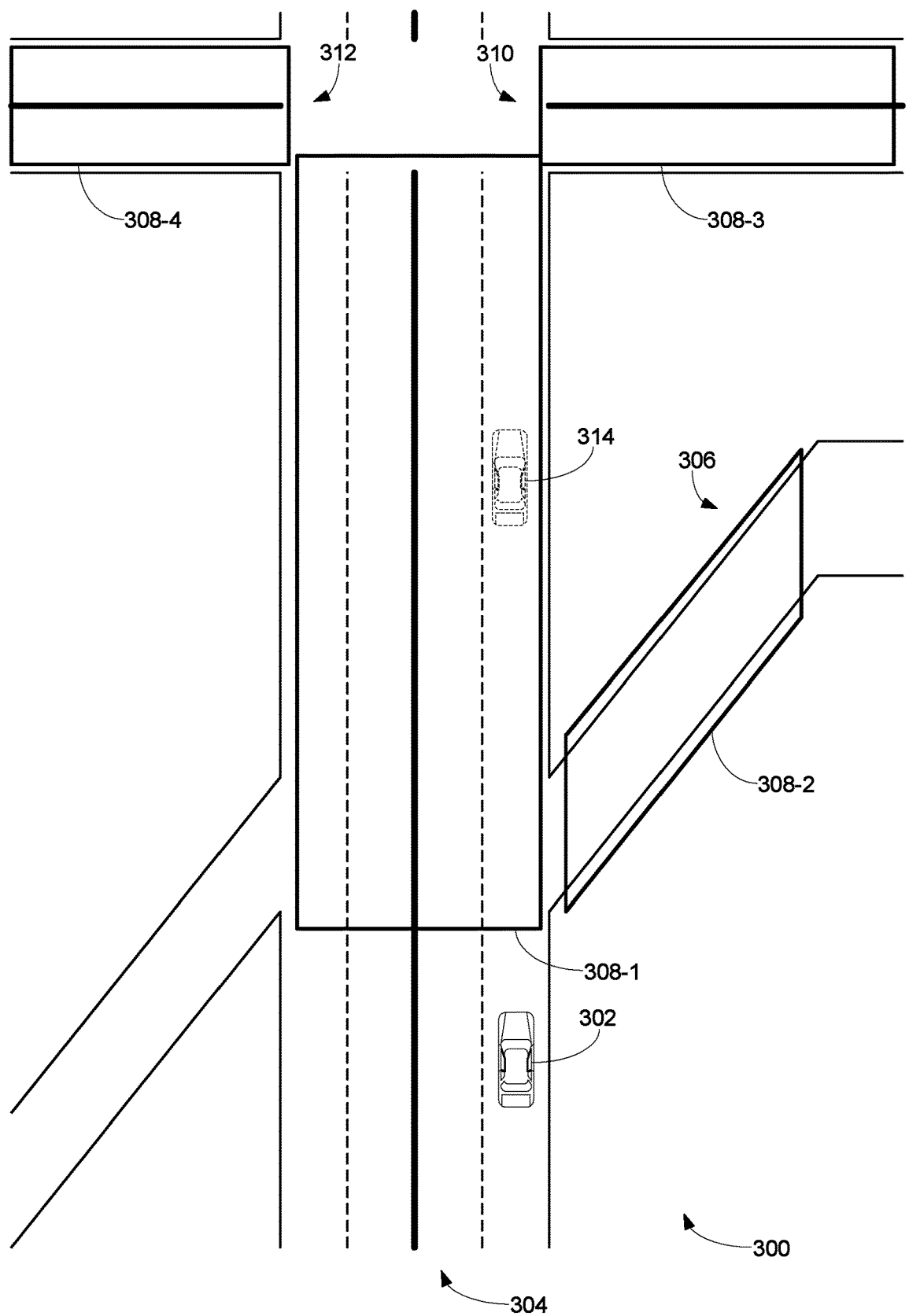
FIG. 3 illustrates an example road layout and associated map regions, according to one or more aspects of the various embodiments.

FIG. 3 illustrates an example road layout and associated map regions, according to one or more aspects of the various embodiments. As described above, ISA server application 174 determined one or more map regions 220 for a vehicle based on one or more predicted positions 208 of the vehicle. FIG. 3 illustrates a road layout 300 and examples map regions that could be determined for road layout 300. As shown, FIG. 3 includes a vehicle 302 at its current location, travelling on road segment 304 in a first direction. A road segment 306 branches from road segment 304 and vehicle 302 can turn right on road segment 306 or continue straight on road segment 304. FIG. 3 further shows an upcoming intersection on road segment 304 where vehicle 302 can turn right into road segment 310 or turn left into road segment 312.

ISA client application 150 in vehicle 302 determines navigation information 204 for vehicle 302, including a geolocation, a travelling direction (the first direction), and a speed of the vehicle. ISA client application 150 transmits navigation information 204 for vehicle 302 to ISA server application 174. Based on navigation information 204 for vehicle 302 and map data 172 corresponding to road layout 300, position prediction module 206 determines that the predicted position of vehicle 302 could be on any of the road segments 304, 306, 310, and/or 312. Based on these predicted positions and map data 172 corresponding to road layout 300, map region module 210 can generate map regions 308 for vehicle 302. Map regions 308 include a map region 308-1 for a portion of road segment 304 in front of vehicle 302, map region 308-2 for road segment 306, and map regions 308-3 and 308-4 for road segments 310 and 312, respectively. As shown, map regions 308 are shaped as polygons (e.g., rectangle, parallelogram), and each map region 308 is associated with a speed limit value. Additionally, map region module 210 can generate a default map region (not shown) in FIG. 3 based on road layout 300, and if a tunnel is in map regions 308 that map region is designated as a tunnel map region. ISA server application 174 transmits map region information 212 indicating map regions 308 to ISA client application 150 in vehicle 302. ISA client application 150 in vehicle 302 selects one of map regions 308 based on a current geolocation of vehicle 302.

After ISA client application 150 receives map region information 212 indicating map regions 308, ISA client application 150 determines a current geolocation of vehicle 302 and selects one of map regions 308 based on the current geolocation. As shown, vehicle 302 has traveled further on road segment 304 to geolocation 314. ISA client application 150 determines, via location module 138, that vehicle 302 is located at geolocation 314. ISA client application 150 then compares geolocation 314 to map region 308 to determine the map region in which geolocation 314 is located, if any. ISA client application 150 determines that geolocation 314 is located in map region 308-1, and in response selects map region 308-1. ISA client application 150 performs one more operations based on the speed limit information associated with map region 308-1 (e.g., output the speed limit value for map region 308-1, check if vehicle 302 is exceeding the speed limit value for map region 308-1). Because map regions 308 are polygonal regions with defined boundaries, comparing a vehicle geolocation to map regions 308 and determining whether the vehicle geolocation is in any of map regions 308 is an operation that uses very little computing resources (e.g., processing power) compared to other approaches, such as comparing a vehicle geolocation to a map database to find speed limit information for the vehicle geolocation.

Figure 4:
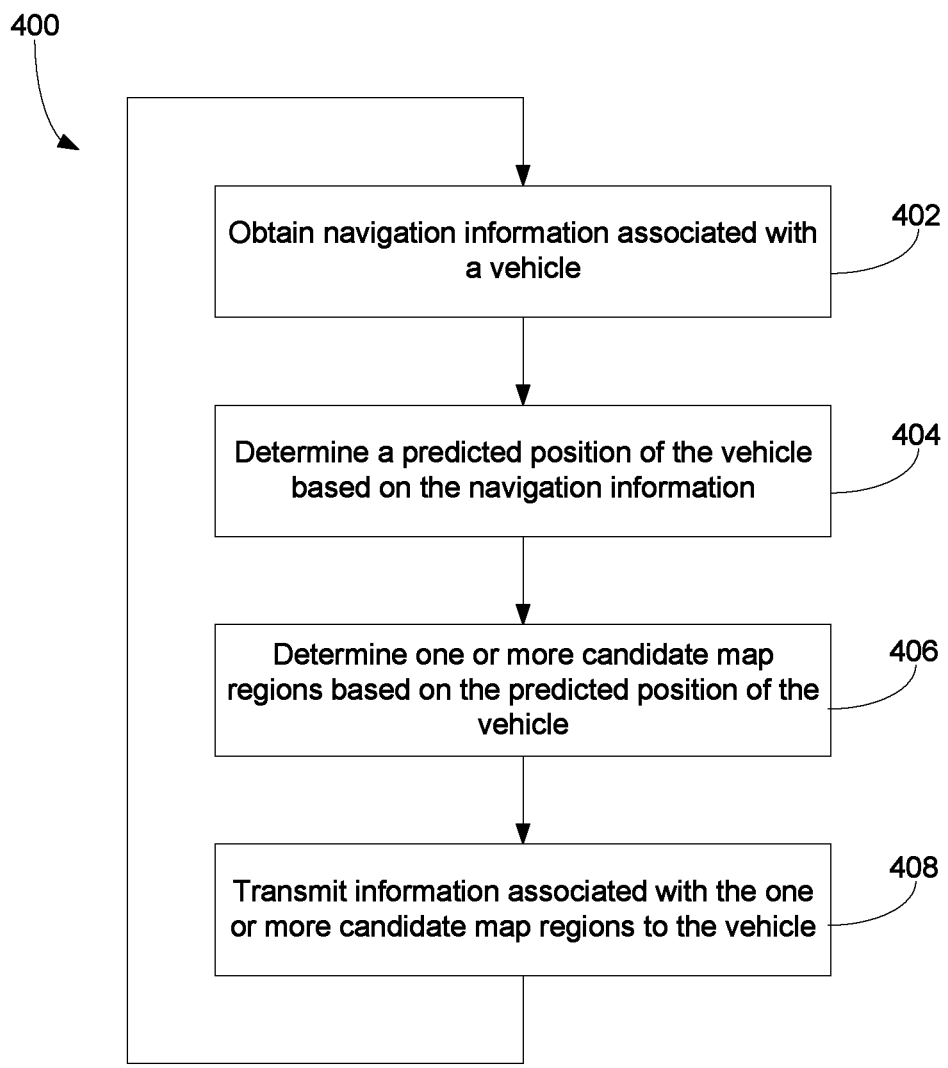
FIG. 4 is a flow chart of method steps for providing speed limit information to a vehicle, according to one or more aspects of the various embodiments.

FIG. 4 is a flow chart of method steps for providing speed limit information to a vehicle, according to one or more aspects of the various embodiments. Although the method steps are described with respect to the systems of FIGS. 1 and 2, persons skilled in the art will understand that any system configured to perform the method steps, in any order, falls within the scope of the various embodiments. Additionally, although the method steps are described using the road layout 300 of FIG. 3 as an example, persons skilled in the art will understand that the method steps of method 400 can be used with any road layout.

As shown, a method 400 begins at step 402, where an ISA server application, such as ISA server application 174, obtains navigation information associated with a vehicle. The ISA server application receives navigation information, such as navigation information 204, from an ISA client application in a vehicle, such as ISA client application 150. The received navigation information includes a geolocation of the vehicle, a travelling direction of the vehicle, and a speed of the vehicle.

At step 404, the ISA server application determines one or more predicted positions of the vehicle based on the navigation information. The ISA server application determines predicted positions by, for example, determining possible travel paths from the vehicle geolocation at the vehicle speed and travelling direction. In some embodiments, the ISA server application determines a road layout in proximity of the vehicle geolocation and determines one or more predicted positions of the vehicle in road layout given the speed and travelling direction.

At step 406, the ISA server application determines one or more candidate map regions based on the one or more predicted positions of the vehicle. As an example, when using the road layout 300, the ISA server application determines the one or more map regions 308 for the one or more predicted positions of the vehicle. In some examples, the ISA server application also determines a default map region that can be used if the vehicle geolocation is not located in any of the other determined map regions. Additionally, if the ISA server application determines that one of the predicted positions matches a road segment in a tunnel, then the ISA server application generates a tunnel map region covering the tunnel road segment.

At step 408, the ISA server application transmits information associated with the one or more candidate map regions to the vehicle. The ISA server application generates map region information that includes information indicating the map regions and transmits the map region information to the ISA client application on the vehicle via a network, such as network 160. The map region information 212 data specifying the boundaries (e.g., defined by vertex coordinates) and speed limit values of the map regions determined in step 406. As an example, when using the road layout 300, the ISA server application would generate map region information that includes data specifying the boundaries and speed limit values of each of map regions 308, and would transmit the map region information to vehicle 302. Method 400 then returns to step 402, where the ISA server application obtains new navigation information associated with the vehicle.

Figure 5:
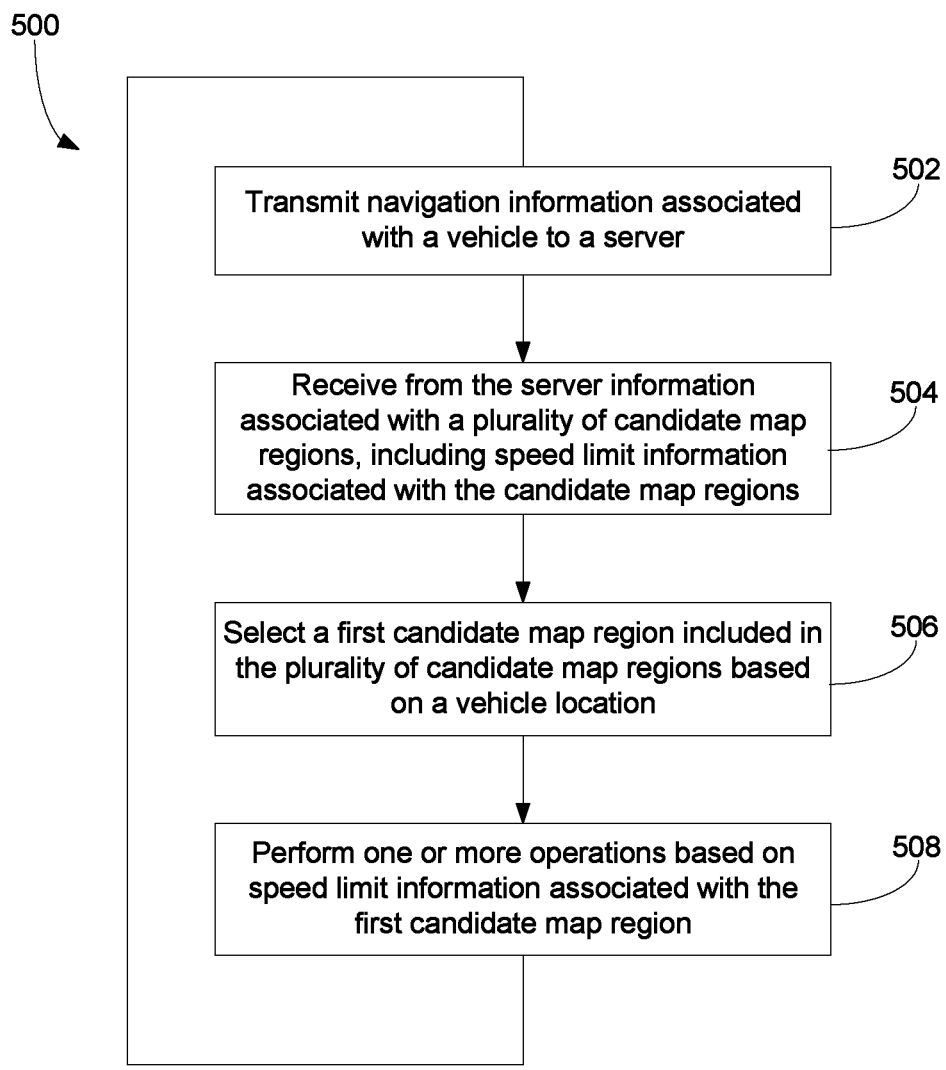
FIG. 5 is a flow chart of method steps for determining speed limit information for a vehicle location, according to one or more aspects of the various embodiments.

FIG. 5 is a flow chart of method steps for determining speed limit information for a vehicle location, according to one or more aspects of the various embodiments. Although the method steps are described with respect to the systems of FIGS. 1-3, persons skilled in the art will understand that any system configured to perform the method steps, in any order, falls within the scope of the various embodiments. Additionally, although the method steps are described using the road layout 300 of FIG. 3 as an example, persons skilled in the art will understand that the method steps of method 500 can be used with any road layout.

As shown, a method 500 begins at step 502, where an ISA client application, such as ISA client application 150, transmits navigation information associated with a vehicle, such as navigation information 204, to a server. The ISA client application in the vehicle determines navigation information for the vehicle and transmits the navigation information to an ISA server application at a server, such as ISA server application 174 at server(s) 170. The navigation information includes a geolocation of the vehicle, a travelling direction of the vehicle, and a speed of the vehicle.

At step 504, the ISA client application receives, from the ISA server application at the server, information associated with a plurality of candidate map regions, including speed limit information associated with the candidate map regions. Each of the map regions includes data specifying the respective boundaries (e.g., defined by vertex coordinates) and speed limit values of the map regions. The candidate map regions are determined by the ISA server application based on the navigation information transmitted in step 502. As an example using map layout 300 when the vehicle with the ISA client application is vehicle 302, the plurality of map regions are the map regions 308.

At step 506, the ISA client application selects a first candidate map region included in the plurality of candidate map regions based on a vehicle location. The ISA client application determines a geolocation of the vehicle and compares the determined geolocation to the boundaries of the map regions received in step 504. The ISA client application selects a map region that includes the geolocation of the vehicle. For example, when the map regions are the map regions 308 and the ISA client application determines that the vehicle is at geolocation 314, the ISA client application selects map region 308-1. In some embodiments, if the ISA client application is unable to determine a geolocation of the vehicle, then the ISA client application selects a tunnel map region. In some embodiments, if the ISA client application determines that the geolocation of the vehicle is not in the polygonal region of any of the plurality of candidate map regions other than the default map region, then the ISA client application selects the default map region.

At step 508, the ISA client application performs one or more operations based on speed limit information associated with the first candidate map region. For example, the ISA client application can output a speed limit value associated with the map region selected in step 506 visually (e.g., display on display 134) and/or audibly (e.g., read out as speech via speakers 132). The ISA client application can additionally determine whether the vehicle is exceeding the speed limit value and, if so, output an alert (e.g., a speeding alert) visually and/or audibly, and/or intervene in operation of the vehicle (e.g., command the brake system to apply the brakes). In an example, the ISA client application of vehicle 302 can display the speed limit value for map region 308-1 on display 134 in vehicle 302. ISA client application 150 at vehicle 302 can also determine a speed of vehicle 302 and whether that speed exceeds the speed limit value for map region 308-1. If the ISA client application determines that the speed exceeds the speed limit value, then the ISA client application can output an alert and/or intervene in operation of vehicle 302 to slow vehicle 302 down. Method 500 then returns to step 502, where the ISA client application transmits new navigation information associated with the vehicle to the server. In some embodiments, the ISA client application waits for a next update time before transmitting the new navigation information.

In sum, an approach for providing speed limit information to a vehicle includes a cloud-based approach. A vehicle provides navigation information, such as geolocation, speed, and travelling direction, to a cloud-based application. The cloud-based application determines, based on the received navigation information, one or more predicted positions for the vehicle. The cloud-based application determines, based on the one or more predicted positions, one or more map regions with corresponding speed limit information. The cloud-based application transmits information identifying the map regions and the speed limit information for those map regions to the vehicle. The vehicle then determines which map region the vehicle is located in and outputs the corresponding speed limit information.

At least one technical advantage of the disclosed techniques relative to the prior art is that, with the disclosed techniques, a vehicle can obtain and output speed limit information using less computational resources, including less processing power and data storage in the vehicle, compared to prior approaches. Accordingly, intelligent speed assistance can be implemented in a vehicle at lower cost, including for example using a simpler, less expensive, lower power processor. Additionally, with the disclosed techniques, a vehicle does not need to have access to a navigational database and does not need to update the navigational database, which reduces the memory and/or storage required in the vehicle, the bandwidth needed to receive the updates, and/or service time at a vehicle dealer to install updates. These technical advantages provide one or more technological improvements over prior art approaches.

1. In some embodiments, a computer-implemented method comprises receiving, from a vehicle, navigation information associated with the vehicle; determining one or more predicted positions associated with the vehicle based on the navigation information; determining one or more candidate map regions associated with the vehicle based on the one or more predicted positions; associating corresponding speed limit information with each of the one or more candidate map regions; and transmitting, to the vehicle, the one or more candidate map regions; wherein the one or more candidate map regions are usable by the vehicle to provide speed limit information to a driver of the vehicle.

2. The method of clause 1, wherein the navigation information comprises a geolocation of the vehicle, and at least one of: a direction and a speed of the vehicle, or a velocity of the vehicle.

3. The method of clauses 1 or 2, wherein a first candidate map region included in the one or more candidate map regions is a polygonal region.

4. The method of any of clauses 1-3, wherein the first candidate map region includes a set of location coordinates corresponding to vertices of the polygonal region.

5. The method of any of clauses 1-4, wherein the corresponding speed limit information for the first candidate map region indicates a speed limit for road segments within the first candidate map region.

6. The method of any of clauses 1-5, further comprising determining that a tunnel is located within a first candidate map region; and designating the first candidate map region is a tunnel map region.

7. The method of any of clauses 1-6, wherein determining one or more candidate map regions associated with the vehicle comprises determining a default map region.

8. In some embodiments, one or more non-transitory computer-readable storage media include instructions that, when executed by one or more processors, cause the one or more processors to perform the steps of transmitting navigation information associated with a vehicle to a server; receiving, at the vehicle and from the server, map region information associated with a plurality of candidate map regions; selecting a first candidate map region included in the plurality of candidate map regions based on a location of the vehicle; and causing one or more operations to be performed at the vehicle based on speed limit information associated with the first candidate map region.

9. The one or more non-transitory computer-readable storage media of clause 8, wherein the map region information comprises, for the first candidate map region, the speed limit information and a set of location coordinates corresponding to vertices of a polygonal region of the first candidate map region.

10. The one or more non-transitory computer-readable storage media of clauses 8 or 9, wherein selecting the first candidate map region based on the location of the vehicle comprises determining that the location of the vehicle is included within the first candidate map region; and in response to the determination that the location of the vehicle is included within the first candidate map region, selecting the first candidate map region.

11. The one or more non-transitory computer-readable storage media of any of clauses 8-10, wherein the plurality of candidate map regions is determined based on the navigation information associated with the vehicle.

12. The one or more non-transitory computer-readable storage media of any of clauses 8-11, wherein the first candidate map region is a default map region, and selecting the first candidate map region included in the plurality of candidate map regions based on the location of the vehicle comprises determining that the location of the vehicle is outside of the plurality of candidate map regions other than the first candidate map region; and in response to determining that the location of the vehicle is outside of the plurality of candidate map regions other than the first candidate map region, selecting the default map region.

13. The one or more non-transitory computer-readable storage media of any of clauses 8-12, wherein the first candidate map region is a tunnel map region, and selecting the first candidate map region included in the plurality of candidate map regions based on the location of the vehicle comprises determining that the location of the vehicle cannot be determined; and in response to determining that the location of the vehicle cannot be determined, selecting the tunnel map region.

14. The one or more non-transitory computer-readable storage media of any of clauses 8-13, wherein the navigation information comprises a geolocation of the vehicle, and at least one of: a direction and a speed of the vehicle, or a velocity of the vehicle.

15. The one or more non-transitory computer-readable storage media of any of clauses 8-14, wherein causing the one or more operations to be performed at the vehicle comprises at least one of: outputting a speed limit value included in the speed limit information associated with the first candidate map region, or intervening in operation of the vehicle based on the speed limit information.

16. In some embodiments, a system implemented at a vehicle comprises a memory storing an application; and one or more processors that, when executing the application, is configured to transmit navigation information associated with the vehicle to a server; receive, from the server, map region information associated with a plurality of candidate map regions; select a first candidate map region included in the plurality of candidate map regions based on a location of the vehicle; and cause one or more operations to be performed at the vehicle based on speed limit information associated with the first candidate map region.

17. The system of clause 16, wherein the navigation information comprises a geolocation of the vehicle, and at least one of: a direction and a speed of the vehicle, or a velocity of the vehicle.

18. The system of clauses 16 or 17, wherein the map region information comprises, for the first candidate map region, the speed limit information and a set of location coordinates corresponding to vertices of a polygonal region of the first candidate map region.

19. The system of any of clauses 16-18, wherein the one or more processors, when executing the application, is configured to determine that the location of the vehicle is included within the first candidate map region; and in response to determining that the location of the vehicle is included within the first candidate map region, select the first candidate map region.

20. The system of any of clauses 16-19, wherein the one or more processors, when executing the application, is configured to at least one of: output a speed limit value included in the speed limit information associated with the first candidate map region, or intervene in operation of the vehicle based on the speed limit information.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
   receiving, by a server from a vehicle, navigation information associated with the vehicle;
   determining, by the server, one or more predicted positions associated with the vehicle based on the navigation information, wherein the one or more predicted positions corresponds to a plurality of road segments;
   acquiring, by the server from a data store storing map data, speed limit information for one or more groups of road segments included in the plurality of road segments;
   determining, for each group of the one or more groups of road segments, that the group of road segments share a common speed limit;
   generating, by the server, one or more candidate map regions associated with the vehicle from the one or more groups of road segments; and
   transmitting, by the server to the vehicle, the one or more candidate map regions;
   wherein the one or more candidate map regions are usable by the vehicle to provide speed limit information to a driver of the vehicle.

2. The method of claim 1, wherein the navigation information comprises a geolocation of the vehicle, and at least one of: a direction and a speed of the vehicle, or a velocity of the vehicle.

3. The method of claim 1, wherein a first candidate map region included in the one or more candidate map regions is a polygonal region.

4. The method of claim 3, wherein the first candidate map region includes a set of location coordinates corresponding to vertices of the polygonal region.

5. The method of claim 1, further comprising:
   determining that a tunnel is located within a first candidate map region; and
   designating the first candidate map region as a tunnel map region.

6. The method of claim 1, wherein determining the one or more candidate map regions associated with the vehicle comprises determining a default map region.

7. One or more non-transitory computer-readable storage media including instructions that, when executed by one or more processors, cause the one or more processors to perform the steps of:
   transmitting navigation information associated with a vehicle to a server;
   receiving, at the vehicle and from the server, map region information associated with a plurality of candidate map regions that the server selected based on the navigation information, wherein the server generates each of the candidate map regions by:
      acquiring, from a data store storing map data, speed limit information for a group of road segments,
      determining that the group of road segments share a common speed limit, and
      generating a candidate map region from the group of road segments;
   selecting a first candidate map region included in the plurality of candidate map regions based on a location of the vehicle; and causing one or more operations to be performed at the vehicle based on speed limit information associated with the first candidate map region.

8. The one or more non-transitory computer-readable storage media of claim 7, wherein:
the map region information comprises, for each candidate map region:
the speed limit information; and
a set of location coordinates corresponding to vertices of a polygonal region of the candidate map region
the steps further comprise:
acquiring, from a data store storing map data, speed limit information for a group of road segments;
determining that the group of road segments share a common speed limit; and
generating the first candidate map region from the group of road segments.

9. The one or more non-transitory computer-readable storage media of claim 7, wherein selecting the first candidate map region based on the location of the vehicle comprises:
determining that the location of the vehicle is included within the first candidate map region; and
in response to the determination that the location of the vehicle is included within the first candidate map region, selecting the first candidate map region.

10. The one or more non-transitory computer-readable storage media of claim 7, wherein the plurality of candidate map regions is determined based on the navigation information associated with the vehicle.

11. The one or more non-transitory computer-readable storage media of claim 7, wherein the first candidate map region is a default map region, and selecting the first candidate map region included in the plurality of candidate map regions based on the location of the vehicle comprises:
determining that the location of the vehicle is outside of the plurality of candidate map regions other than the first candidate map region; and
in response to determining that the location of the vehicle is outside of the plurality of candidate map regions other than the first candidate map region, selecting the default map region.

12. The one or more non-transitory computer-readable storage media of claim 7, wherein the first candidate map region is a tunnel map region, and selecting the first candidate map region included in the plurality of candidate map regions based on the location of the vehicle comprises:
determining that the location of the vehicle cannot be determined; and
in response to determining that the location of the vehicle cannot be determined, selecting the tunnel map region.

13. The one or more non-transitory computer-readable storage media of claim 7, wherein the navigation information comprises a geolocation of the vehicle, and at least one of: a direction and a speed of the vehicle, or a velocity of the vehicle.

14. The one or more non-transitory computer-readable storage media of claim 7, wherein causing the one or more operations to be performed at the vehicle comprises at least one of:

outputting a speed limit value included in the speed limit information associated with the first candidate map region, or
intervening in operation of the vehicle based on the speed limit information.

15. A system implemented at a vehicle comprising:
a memory storing an application; and
one or more processors that, when executing the application, is configured to:
transmit navigation information associated with the vehicle to a server;
receive, from the server, map region information associated with a plurality of candidate map regions that the server selected based on the navigation information wherein the server generates each of the candidate map regions by:
acquiring, from a data store storing map data, speed limit information for a group of road segments,
determining that the group of road segments share a common speed limit, and
generating a candidate map region from the group of road segments;
select a first candidate map region included in the plurality of candidate map regions based on a location of the vehicle; and
cause one or more operations to be performed at the vehicle based on speed limit information associated with the first candidate map region.

16. The system of claim 15, wherein the navigation information comprises a geolocation of the vehicle, and at least one of: a direction and a speed of the vehicle, or a velocity of the vehicle.

17. The system of claim 15, wherein:
the map region information comprises, for each candidate map region:
the speed limit information; and
a set of location coordinates corresponding to vertices of a polygonal region of the first candidate map region
the server generates the first candidate map region by:
acquiring, from a data store storing map data, speed limit information for a group of road segments;
determining that the group of road segments share a common speed limit; and
generating the first candidate map region from the group of road segments.

18. The system of claim 15, wherein the one or more processors, when executing the application, is configured to:
determine that the location of the vehicle is included within the first candidate map region; and
in response to determining that the location of the vehicle is included within the first candidate map region, select the first candidate map region.

19. The system of claim 15, wherein the one or more processors, when executing the application, is configured to at least one of:
output a speed limit value included in the speed limit information associated with the first candidate map region, or
intervene in operation of the vehicle based on the speed limit information.

* * * * *